United States Patent [19]

Behn et al.

[11] Patent Number: 4,553,607
[45] Date of Patent: Nov. 19, 1985

[54] RIDGE CLEANING ATTACHMENT FOR PLANTERS

[76] Inventors: Ernest E. Behn, R.R. #1, Boone, Iowa 50036; Jerome L. Behn, R.R. #1, Madrid, Iowa 50156

[21] Appl. No.: 542,534

[22] Filed: Oct. 17, 1983

[51] Int. Cl.⁴ .................... A01B 39/08; A01B 39/14
[52] U.S. Cl. ................................ 172/156; 172/140; 172/624.5; 172/504
[58] Field of Search ............... 172/624.5, 156, 159, 172/184, 187, 574, 575, 140; 111/85

[56] References Cited

U.S. PATENT DOCUMENTS

| | | | |
|---|---|---|---|
| 2,644,387 | 7/1953 | Klamplade | 172/624.5 |
| 4,054,007 | 10/1977 | Moore | 172/624.5 |
| 4,377,979 | 3/1983 | Peterson | 111/85 |
| 4,393,791 | 7/1983 | Suderman | 111/85 |
| 4,430,952 | 2/1984 | Murray | 111/85 |
| 4,432,292 | 2/1984 | Scott | 111/85 |
| 4,461,355 | 7/1984 | Peterson | 172/624.5 |

OTHER PUBLICATIONS

Hiniker Econ-O-Till Cultivator—advertizing brochure of Hiniker Co. Mankato, MN 7/1981.
Hiniker Econ-O-Till Planter and Adaptor Kit advertizing brochure of Hiniker Co. Mankato MN 7/1980.

*Primary Examiner*—Richard J. Johnson
*Attorney, Agent, or Firm*—James F. Simon

[57] ABSTRACT

This invention relates to an attachment for conventional planters that will convert them to ridge-till planters at reasonable costs. It consists of a pair of laterally spaced vertical mounting bars, fastened suitably at their upper end to the parallel linkage of a planter, extending downward to connect pivotally to the rearward end of a horizontal L-shaped parallel linkage, whose forward ends connect pivotally to the horizontal frame of this invention called the ridgemate. At the forward end of the horizontal frame is a drum wheel that runs on top of a ridge and gives constant height to the horizontal support frame. To the rear of the drum wheel is a pair of disk openers, adjusted in depth by a tubular screw arrangement. Following closely and to the rear of the disk openers is a sweep to widen and further clean off the ridge. The sweep also is adjusted in its operating depth by a tubular screw arrangement. The L-shaped parallel linkage allows the ridge trimmer to operate independently of the planter units to which it is attached. Because of the L-shaped parallel linkage and the positive depth settings available, the ridgemate will proceed ahead of a planter unit (to which it is attached) and cut off a ridge in a completely controlled manner, providing ideal planting environment for the planter that follows.

6 Claims, 3 Drawing Figures

RIDGE CLEANING ATTACHMENT FOR PLANTERS

BACKGROUND OF INVENTION

In recent years, farmers are beginning to recognize the advantages of "ridge" farming. They will throw large amounts of soil up against the growing crop to form a large ridge while cultivating their crop during summer summer months. This ridge may be 8 or 9 inches high. The next planting season they will plant directly on top of these ridges leaving all of last years crop residue on top of the ground to prevent erosion. This planting on top of the ridge is possible because the residues fall down in the valley between the ridges, allowing the top of the ridges to dry out and warm up early in the spring or planting season. It is not necessary to do any tillage of the ridge before planting because frost in winter or just time and weathering will make the ridge mellow and just right for planting. To to this planting a regular ridge-till planter is used. It will cut off a thin portion of the top of the ridge and place seed in the firm moist warm soil encountered there, resulting in a good stand, early emergence, and fast growth. A complete ridge-till planter is expensive and the farmer hesitates to make this investment. If he has a late model conventional planter like a John Deere, International, White, Kinze, etc. he would rather keep it than trade it off. Our invention is an attachment designed to be bolted quickly on to a conventional planter to convert it to a ridge-till planter. This attachment is designed to cut off the top of the ridge in a controlled manner, exposing a firm, moist, warm seedbed about 10 or 12 inches wide, free of residue, in which a conventional planter can plant without encountering problems normally associated with residue.

Several companies make double "trash whippers", bolted solidly to the forward from of conventional planters to push residues aside for planting in hevy residue, but they have no means for controlling depth of cut and are unsatisfactory. Several other companies make "attachments" to cut off the top of the ridge, but they are bolted to the tool bar frame, or to a separate tool bar frame ahead of planter. They are all 24 inches tall or more, they are out in front or just behind the tool bar of the planter and all require planter modification to allow them to fit and operate normally. Our attachment will fasten behind the tool bar of planter, either to the planter unit forward frame or the parallel linkage of the planter unit. It is designed with a low profile, only 12 inches high to operate safely under the planter tool bar and no planter modification is necessary.

SUMMARY

Our invention discloses a mechanical attachment for normaal conventional planters to convert them to ridge-till planters. To do this we started with a varaible mounting bar bracket, whose shape may be changed to fit the parallel linkage or front frame of any conventional planting unit. For this disclosure the mounting bar bracket consists of two parallel vertical bars, fastened to the horizontal linkages of a conventional planter with bolts and spacers to allow independent movement. These mounting bars extend downward to approximately 8 inches above the ground. To these mounting bars we have connected a pair of "L" shaped horizontal parallel linkages that reach forward to the frame of our device. This parallel linkage allows our device to move up and down independently of the planter unit. The "L" shape is designed to abut when planter unit is lifted and it will keep our device from going down too far and be carried above ground when not in use.

At forward end our device is attached a drum wheel that operates on the top or sides of a ridge to carry the frame of our device at a constant height, approximately 12 inches above the ground, regardless of how much the planter unit goes up and down. Behind the drum wheel is a pair of opposing disks that clear out residues and some soil from the top of the ridge. The disks are mounted to the horizontal frame through a screw type depth control device, whereby the side of the screw mount is slotted so the disk mount can move up and down through the slot on the side instead of the end as is the usual situation. This side mount is necessary to maintain to low profile necessary for our invention to operate under the tool bar of planter. Following the disks is a sweep to further clear the ridge of weeds and residue, creating a crowned ridge top. The sweep is also mounted to the horizontal frame by a depth regulating device, similar to the double disk regulating device. We are now able to operate a conventional planter in ridges.

At the time of this application no known company or person has disclosed a ridge cleaning device with the combination of virtues here presented.

One object was to devise a ridge timmer that would be of low profile so it could operate under the drawbar and not interfere with working mechanism of the planter. Then no planter alterations would be necessary. (All other devices are 24 to 36 inches high, bolt on the front or back of the planter tool bar, and expensive planter alterations must be made to make them fit on the tool bar.)

A further object is to use both double disks and sweep to clear the ridge top creating a slightly crowned ridge top so rain water still easily move from the ridge down to the valleys between the row ridges where it will encounter the residues and not cause erosion. No other known device uses both a double disk and sweep.

A further object was to design an "L" shaped parallel linkage that would abut against each other so as to limit the down travel of our invention so it could be easily carried above ground when planter is up out of planting position. This same linkage is to permit planter to move up or down, or the ridge trimmer to move up or down without affecting each other. It also guarantees the continued horizontal travel of our devices regardless of its vertical position.

A further object was to employ a sweep in such manner that it would never plug with debris. To accomplish this the forward point of the sweep was placed above the bottom of disk openers as it trails behind the disks. If any residue is not cut by sweep it will slip under the sweep and pass harmlessly by.

DESCRIPTION OF PREFERRED EMBODIMENT

Figure 1:
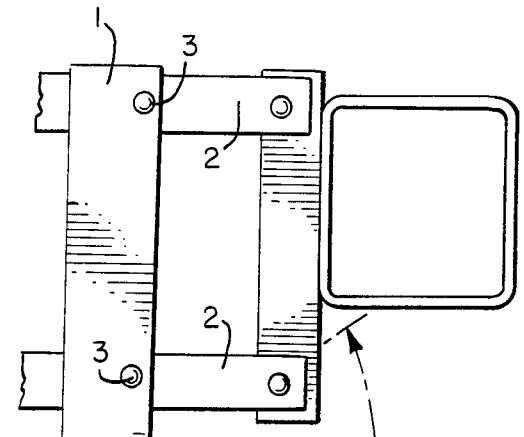
FIG. 1 shows a side view of our invention with vertical mounting bars fastened to the parallel linkage of a conventional planter, extending downward to the horizontal "L" shaped parallel linkage. On the forward end of the support frame is drum wheel that keeps the support frame at a constant height, followed by the double disks and then the sweep.

Two vertical mounting bars 1 are fastened to the parallel linkages 2 of a conventional planter by bolts 3 which allow movement up or down of the mounting bar 1 as the parallel linkage 2 of the planter responds to uneven soil by moving up or down.

At the lower end of mounting bars 1 are two bolts 4 long enough to go through the spacers 5 to the "L" shaped parallel linkages 6 of our invention. Spacers 5 can vary in size and shape so our invention can be made to fit any planter. Parallel linkages 6 extend forward to the outer frame 7 of our invention.

Figure 3:
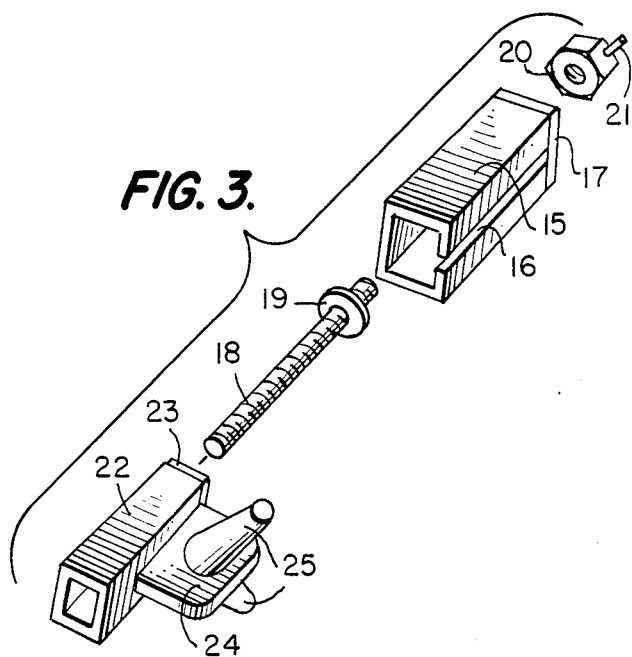
FIG. 3 is a detail of the newly designed depth regulator for both the sweep and disk hiller. It is unique because the mounting plate is on the side, a necessary part of the low profile design.
Figure 2:
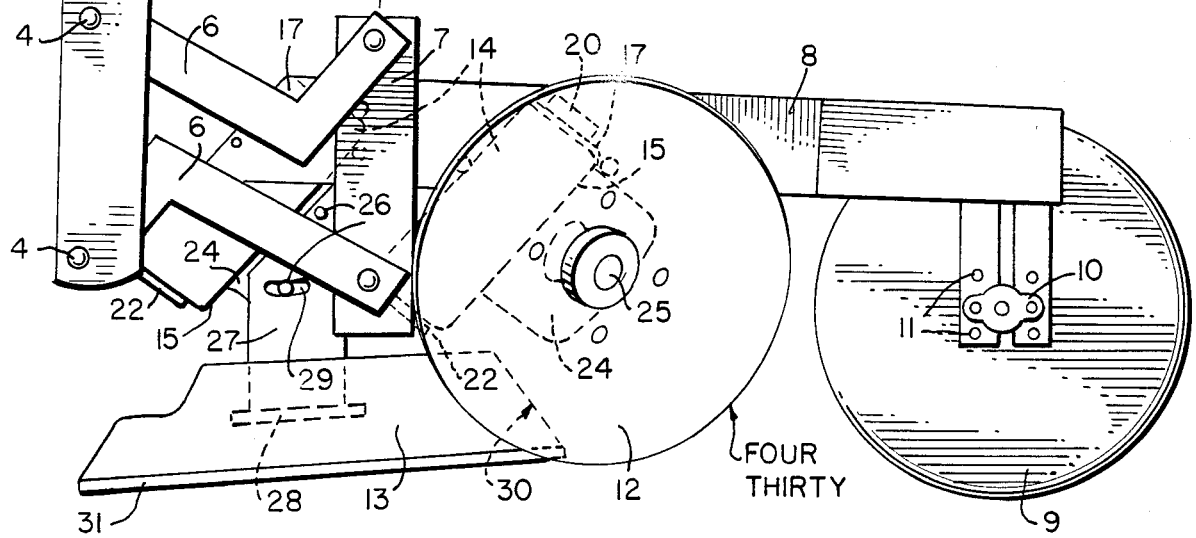
FIG. 2 is a view from the top, showing a little more of the depth controllers, the sweep, the disks openers, and more details of the double horizontal mounting bar.
Figure 2:
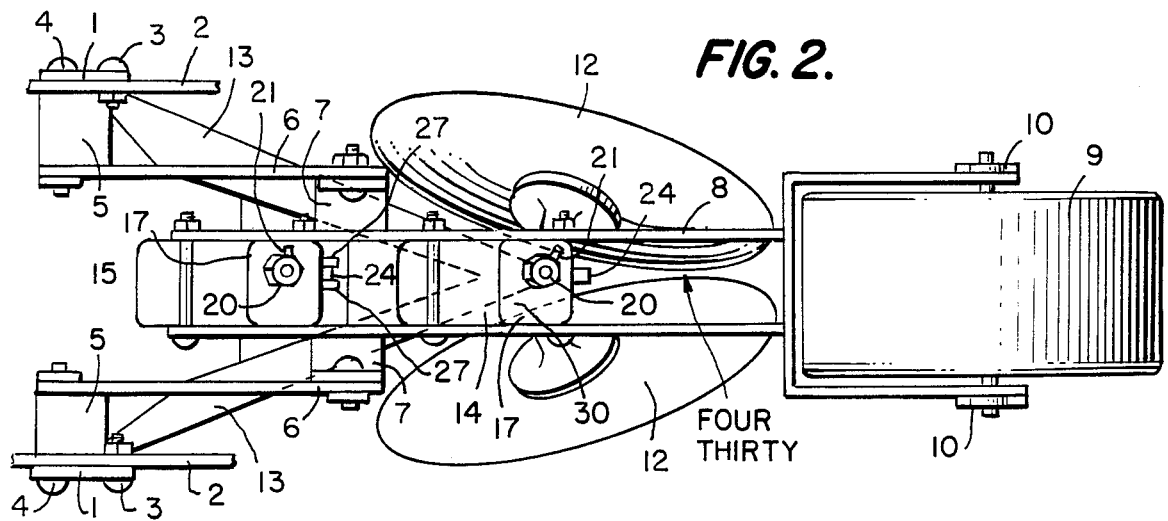

The outer frame 7 is welded to the main frame 8. At the forward end of main frame 8 is a "drum" wheel 9, approximately six inches wide and about 12 inches high. The drum wheel 9 runs on top of the ridge and carries the frame always exactly a constant elevation above ground level. Wheel 9 is called a drum wheel because both sides are filled in solid so no soil can collect inside the rim of the wheel. Drum wheel 9 is supported by two roller bearings 10 and can be adjusted up or down one inch by using the extra holes 11. In this case the frame will be carried at 12 inches or at 11 inches if so desired by the operator. In either case the height of main frame 8 is always constant. Behind the drum wheel 9 are two disks 12, arranged so they come together in front but are approximately 12 inches apart on the back side. This is a critical arrangement. If the disks 12, in FIG. 1, were a clock, the disks should come together in front at four thirty because this is the point at which they first come in contact with the soil as they move forward. When arranged in this manner they do the best possible job of penetrating the soil and cutting residue. The opposite sides of the disks 12 must not be more than 12 or 13 inches apart or they will come in contact with drive chains, support wheels, or other parts of the planter to which our invention is attached. At this angle they clear a path only six inches wide, so we follow the disks 12 with a sweep 13 to push the soil further out into the valley between the ridges on which we are planting. We now have a clean strip on top of the ridge 10 or 12 inches wide and this is desirable, but as soil conditions vary, disks 12 and sweep 13 must be adjusted for depth. This is done with two angular screw devices 14 on FIG. 3. In FIG. 1 these parts are pretty well hidden from view so hidden parts are shown in dotted lines. Details of these depth controllers are shown in FIG. 3. Outer shell 15 is a square steel tube, thick enough to be strong. At the top of outer shell 16 is a plate 17 with a hole in the center large enough for bolt 18 to slip through. Bolt 18 has threads for its entire length. Near the upper end is a washer 19 welded to the bolt. This bolt 18 is then inserted into outer shell 15 (see arrow) until the short portion protrudes through the hole in plate 17. Then nut 20 is threaded on to the bolt 18 until it fits snugly but the bolt can still turn. Then pin 21 is driven through a hole in the nut 20 and bolt 18 to lock them together. Now inner shell 22 must be placed inside outer shell 15. Shell 22 has a plate 23 welded to its upper end, but unlike plate 17, plate 23 has a hole in the center that is threaded to match the threads on bolt 18. Now by turning nut 20, inner shell 22 can be drawn up into outer shell 18 and can be held in any position. Up to now FIG. 3 resembles other depth control devices. But our invention could be only 12 inches high. This "low profile" is necessary to operate under the tongue, fertilizer drive shaft, and other working parts of the conventional planters so we had to redesign the depth regulator as shown in FIG. 3. This is new and a necessary part of the ridge mate. We put a three-fourth inch wide slot 16 the entire length of outer shell 15 to allow plate 24 (welded to inner shell 22) to move up or down through the slot 16 as nut 20 is turned. To plate 24 is welded two axles 25 to support two disks 12 that are used to cut residue and push soil off top of ridge. With the depth control (FIG. 3) we can adjust the depth of cut to the best possible condition, and we can do it inside the 12 inch height limit which we had to meet. All other depth control units of this type fasten on the lower end of inner casing 22 and extend on down 12 or 15 inches. We could not use that on our machine. This is the only one like this and designed by us to meet this need.

Instead of axles, the plate 24 on the rear depth control unit, has two holes 26 with bolts to hold the double plates 27 in position. Double plates 27 are welded to a horizontal plate 28. Plate 28 is cut at an angle on both ends and is welded to sweep blades 13 so the whole unit can be held in position by bolts 26. Double plates 27 have a slot 29 cut in them to allow for raising or lowering the front point 30 of sweep 13. When bolt 26 is tight the sweep 13 is held in place. When bolt 26 is loosened the sweep 13 can be adjusted. On the lower edge of sweep 13 is a strip of hard, sharp metal 31 that can be replaced when wear from usage takes place.

Now our invention is ready to operate. As the planter moves forward wheel 9 moves along on top of the ridge and carries the frame 8 at a constant height. Disks 12 are adjusted to operate maybe one inch lower than the bottom of wheel 9. Then it will penetrate the soil one inch at all times, pushing one inch of soil to right and left as it moves. Then sweep 13 is adjusted so point 30 is one half inch above the bottom of disk 12 so it will never catch residues. The wings of the sweep are adjusted one half inch lower than the bottom of disk 12 so they will give the loosened soil and residues an extra push off from the top of the ridge into the valley between ridges. Then there remains a clean smooth mellow strip of soil for the "conventional" planter to plant seeds in. The conventional planter has now been converted to a no-till planter.

We claim:

1. An attachment for a planter designed to plant on level ground to adapt the planter to plant along ridges, said planter including a transversely extending tool bar having at least one planter unit secured thereto by laterally spaced upper and lower arms arranged in a parallelogram type linkage, said attachment comprising a pair of laterally spaced vertically extending mounting bars each having spaced apart openings to align with and pivotally attach to the upper and lower arms of the parallelogram linkage, the lower end of each said mounting bar pivotally mounting a rearward end of a forwardly extending parallelogram linkage comprising a plurality of arms attached at their forward ends to a vertical outer frame portion of a generally horizontally extending main frame, said main frame including a forward centrally mounted gauge wheel, a pair of forwardly and downwardly converging discs aligned with said gauge wheel, a sweep mounted behind and aligned with said discs.

2. The invention defined in claim 1 wherein the discs are vertically adjustably mounted on said main frame.

3. The invention defined in claim 2 wherein the mounting for vertical adjustment includes an outer shell member having an elongated slot along one side thereof, an inner shell slideably adjustable within said outer shell and including a pair of axles secured to a plate attached to said inner shell and projecting outwardly through said slot.

4. The invention defined in claim 1 wherein the sweep includes a mounting permitting vertical adjustment with respect to said main beam.

5. The invention defined in claim 4 wherein the sweep mounting includes an upper shell secured to said beam, an inner shell slideably adjustable within said outer shell, a slot along one side of said outer shell, a plate member secured to said inner shelf and extending outwardly through said slot, said plate including fastening means for securing said sweep in a plurality of upwardly or downwardly inclined positions.

6. An attachment for a planter designed to plant on level ground to adapt the planter to plant along ridges, said planter including a transversely extending tool bar having at least one planter unit secured thereto by laterally spaced upper and lower arms arranged in a parallelogram type linkage, said attachment comprising a pair of laterally spaced vertically extending mounting bars having spaced apart openings to align with and pivotally attach to the upper and lower arms of the parallelogram linkage, the lower end of each said supporting bar pivotally mounting one end of a forwardly extending parallelogram linkage comprising a plurality of arms attached at their forward ends to vertical portion of a generally horizontally extending main frame, the arms of said attachment linkage constructed as L-shaped members with the back side of the L-shape opposing one another whereby said back sides will abut to limit downward movement of said main frame.

* * * * *